(12) United States Patent
Hering

(10) Patent No.: US 9,476,744 B2
(45) Date of Patent: Oct. 25, 2016

(54) INTEGRATED ORIFICE PLATE ASSEMBLY

(71) Applicant: Dieterich Standard, Inc., Boulder, CO (US)

(72) Inventor: Michael Hering, Louisville, CO (US)

(73) Assignee: Dieterich Standard, Inc., Boulder, CO (US)

( * ) Notice: Subject to any disclaimer, the term of this patent is extended or adjusted under 35 U.S.C. 154(b) by 0 days.

(21) Appl. No.: 14/865,065

(22) Filed: Sep. 25, 2015

(65) Prior Publication Data

US 2016/0103003 A1    Apr. 14, 2016

Related U.S. Application Data

(60) Provisional application No. 62/061,517, filed on Oct. 8, 2014.

(51) Int. Cl.
*G01F 1/42* (2006.01)

(52) U.S. Cl.
CPC ........................................ *G01F 1/42* (2013.01)

(58) Field of Classification Search
CPC ............... G01F 1/42; G01F 1/34; G01F 1/37
USPC ............................. 73/861.61, 861.42, 861.52
See application file for complete search history.

(56) References Cited

U.S. PATENT DOCUMENTS

| | | |
|---|---|---|
| 1,480,661 A | 1/1924 | Brown |
| 1,559,547 A | 11/1925 | Brown |
| 4,249,164 A | 2/1981 | Tivy |
| 6,053,056 A * | 4/2000 | Zaiser .................. F16K 3/34 251/205 |
| 6,101,885 A * | 8/2000 | Touzin .................. G01F 1/3209 73/861.22 |
| 6,311,568 B1 | 11/2001 | Kleven |

(Continued)

FOREIGN PATENT DOCUMENTS

| | | |
|---|---|---|
| GB | 298 682 | 10/1928 |
| GB | 1 202 147 | 8/1970 |

(Continued)

OTHER PUBLICATIONS

Notification of Transmittal of the International Search Report and the Written Opinion from PCT/US2015/053932, dated Jan. 7, 2016.

*Primary Examiner* — Jewel V Thompson
(74) *Attorney, Agent, or Firm* — Westman, Champlin & Koehler, P.A.

(57) ABSTRACT

An orifice plate assembly for use with a process variable transmitter for measuring flow of a process fluid includes a single piece body having a circumferential support ring. A first face of the circumferential support ring is configured to be sealingly coupled to a first flange of a first process pipe. A second face of the circumferential support ring is configured to be sealingly coupled to a second flange of a second process pipe. A flow plate region is positioned between the first and second pipes and has first and second sides. The flow plate region is concentric with the circumferential support ring. At least one flow orifice in the flow plate region provides a restricted fluid path between the first and second process pipes. A first pressure tap is configured to fluidically couple to the process variable transmitter to the process fluid proximate the first side of the flow plate region. A second pressure tap configured to fluidically couple the process variable transmitter to the process fluid proximate the second side of the flow plate region.

18 Claims, 4 Drawing Sheets

(56) References Cited

U.S. PATENT DOCUMENTS

| | | | |
|---|---|---|---|
| 6,324,917 B1* | 12/2001 | Mack | G01F 1/372 |
| | | | 73/861.52 |
| 6,543,297 B1 | 4/2003 | Kleven | |
| 6,622,573 B2 | 9/2003 | Kleven | |
| 6,871,881 B1 | 3/2005 | Hutton | |
| 7,051,765 B1* | 5/2006 | Kelley | G01F 1/42 |
| | | | 138/40 |
| 7,255,012 B2 | 8/2007 | Hedtke | |
| 7,284,450 B2 | 10/2007 | Orleskie et al. | |
| 7,798,016 B2* | 9/2010 | Bonassa | G01F 1/40 |
| | | | 73/861.61 |
| 2003/0188586 A1* | 10/2003 | Orleskie | G01F 1/34 |
| | | | 73/861.61 |
| 2008/0307896 A1 | 12/2008 | Ifft et al. | |
| 2014/0260670 A1 | 9/2014 | Strom et al. | |

FOREIGN PATENT DOCUMENTS

| | | |
|---|---|---|
| GB | 1 314 766 | 4/1973 |
| GB | 2 301 676 A | 11/1996 |
| JP | 6-213694 A | 8/1994 |
| WO | WO 01/20267 | 3/2001 |

* cited by examiner

INTEGRATED ORIFICE PLATE ASSEMBLY

CROSS-REFERENCE TO RELATED APPLICATION

The present application is based on and claims the benefit of U.S. provisional patent application Ser. No. 62/061,517, filed Oct. 8, 2014, the content of which is hereby incorporated by reference in its entirety.

BACKGROUND

The present invention relates to measurement of flow of process fluid. More specifically, the invention relates to measurement of a flow of process fluid by measuring a differential pressure generated across an orifice plate.

Various techniques are known for measuring flow of process fluid. One technique involves the insertion of a restrictive element in a flow of process fluid. This element creates a differential pressure which can be measured and related to the flow rate.

Orifice plates are one example of a restrictive element which can be placed in a flow of process fluid. An orifice plate assembly may include a number of components and fluidically couples to a process variable transmitter which is configured to measure a differential pressure. Some applications, such as nuclear safety and severe service related applications, are typically subject to the potential of severe vibration (seismic criteria), high temperature, high pressure, or all three. Such an environment may cause damage or failure to some prior art orifice plate assemblies and pressure measurement components.

SUMMARY

A single piece orifice plate assembly includes an orifice plate configured to be positioned in a flow of process fluid. An integral circumferential support ring is provided. An upstream pressure tap extends through the circumferential support ring, and a downstream pressure tap which through the circumferential support ring.

An orifice plate assembly for use with a process variable transmitter for measuring flow of a process fluid includes a single piece body having a circumferential support ring. A first face of the circumferential support ring is configured to be sealingly coupled to a first flange of a first process pipe. A second face of the circumferential support ring is configured to be sealingly coupled to a second flange of a second process pipe. A flow plate region is positioned between the first and second pipes and has first and second sides. The flow plate region is concentric with the circumferential support ring. At least one flow orifice in the flow plate region provides a restricted fluid path between the first and second process pipes. A first pressure tap is configured to fluidically couple to the process variable transmitter to the process fluid proximate the first side of the flow plate region. A second pressure tap configured to fluidically couple the process variable transmitter to the process fluid proximate the second side of the flow plate region.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

An integrated/single piece orifice plate (wafer) assembly is provided which is formed as a single-piece wafer without any welds or appendages, and provides for easy centering in the pipe. The assembly does not contain any integrated instrument valves, allowing a user to provide their own, plant-specific instrument valves. The design allows a compact orifice plate configuration to be used with flanges of various ratings and can be offered in alternative materials.

In one example aspect, a machined severe service compact orifice meter is designed to be inserted between pipes having two industry standard flanges. The wafer with integrated orifice plate is machined from a single piece or bar and matches the outer diameter (OD) of the mating flanges and contains bolt holes to allow bolting to be captured (and protected) by the wafer. Integrated threaded or socketweld taps employ a corner tap design and are spaced 90-degrees apart to reduce the thickness of the wafer and allow proper orientation of the taps depending on fluid service. The entire assembly does not require any moving parts, gaskets, bolts, studs, or nuts other than the gaskets, bolts and nuts used to mount the assembly to pipe flange. The compact wafer design with integral remote connections allow the device to be used at high pressures/temperatures, and/or in high vibration environments.

As the device is made from a single piece of material, it can be made from any suitable available material that can be machined, 3D printed in plastic or metal or otherwise manufactured.

Figure 1:
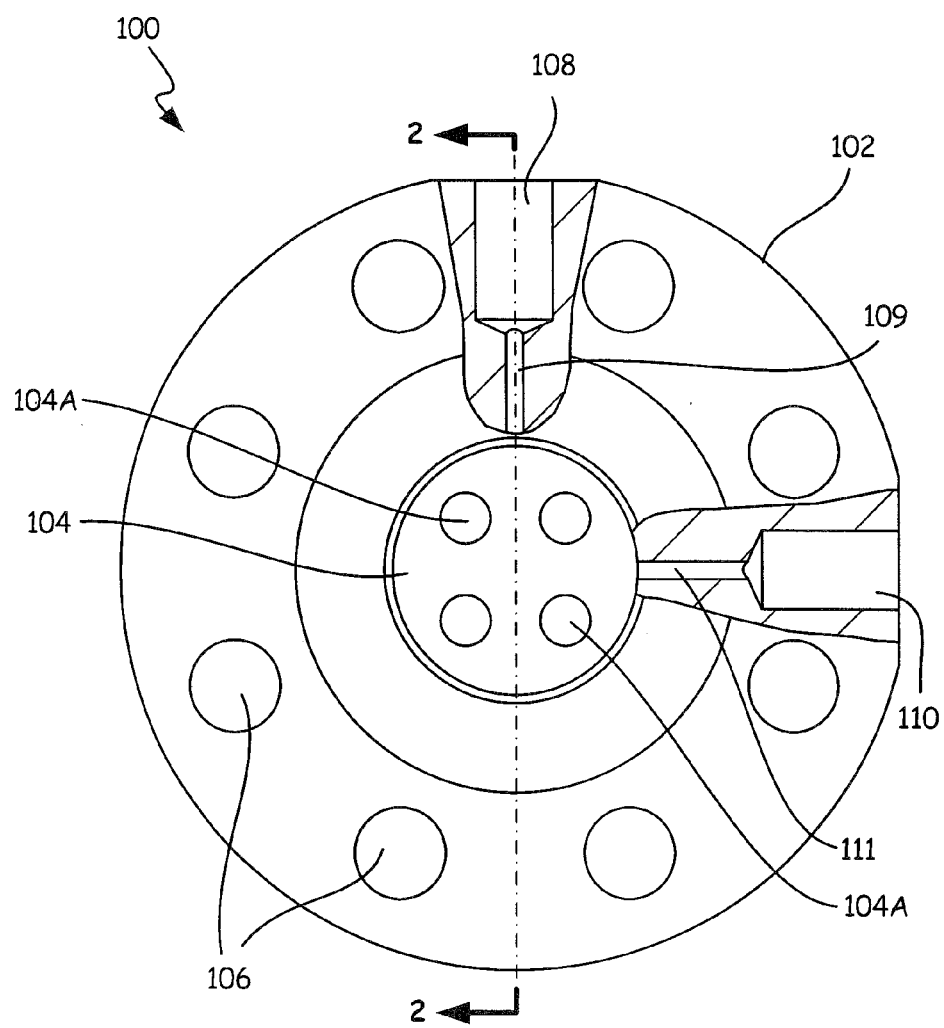
FIG. 1 is a front plan partial cutaway view of an integrated orifice plate assembly in accordance with one example embodiment.
Figure 2:
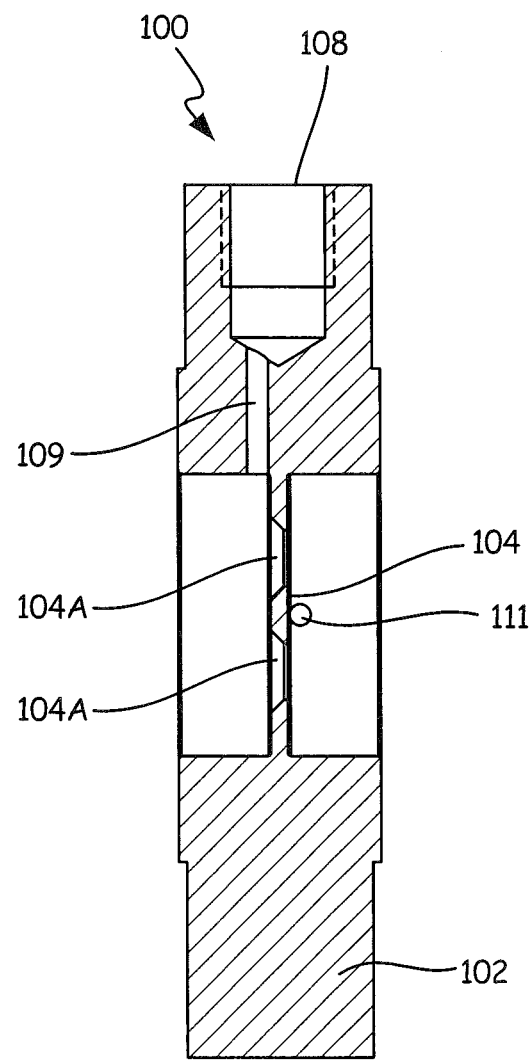
FIG. 2 is a side cross-sectional view of the integrated orifice plate assembly of FIG. 1.
Figure 3:
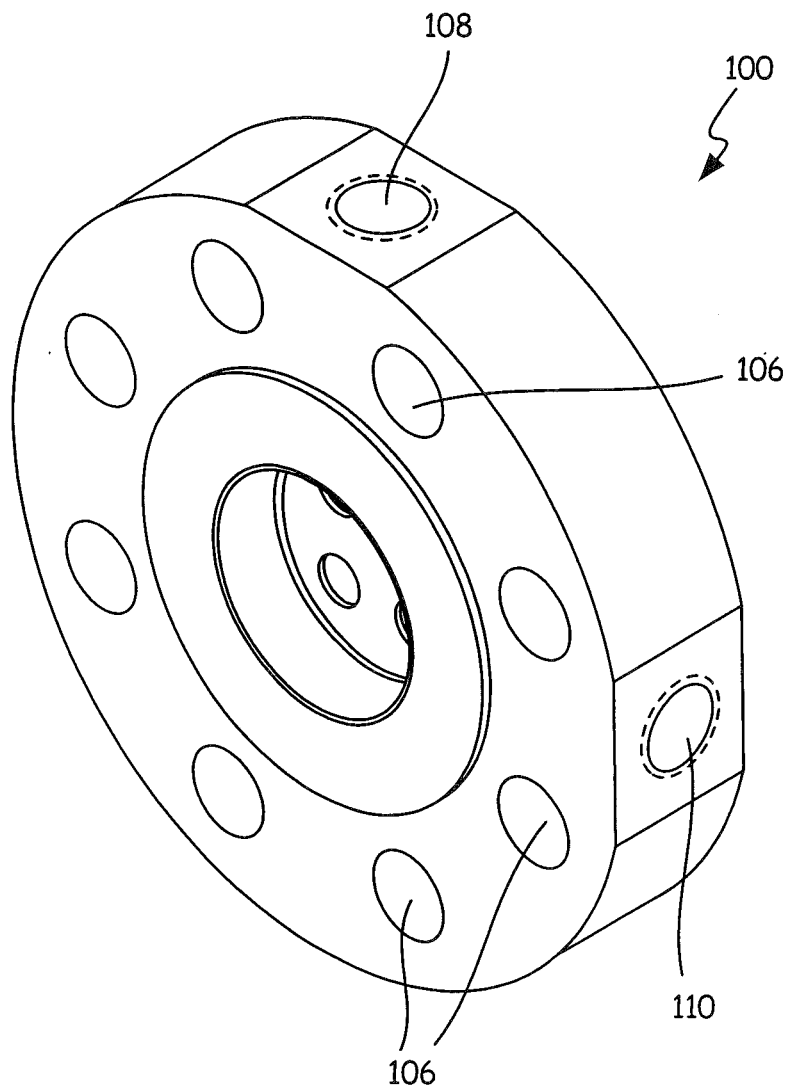
FIG. 3 is a perspective view of the integrated orifice plate assembly of FIG. 1.

FIGS. 1, 2 and 3 show a front plan, a side cross-sectional and a perspective view of an integrated compact conditioning orifice plate assembly 100 in accordance with one example configuration.

Orifice plate assembly 100 is a single piece body which includes circumferential support ring 102 having opposed first and second faces which supports an orifice plate region 104. Flow plate 104 also has opposed first and second sides and is arranged concentric with circumferential support ring 102. Elements 102 and 104 are formed integrally and, in one configuration, are not welded or otherwise bonded together as separate components. Orifice plate 104 is illustrated as a conditioning orifice plate which includes four radially spaced openings (flow orifices) 104A which are configured to reduce disturbances in the flow of process fluid as the process fluid passes through the openings 104A. Circumferential support ring 102 includes a plurality of openings 106 formed therein which are configured to receive mounting bolts (120 in FIG. 4) therethrough. Opposed pipe flanges (122 in FIG. 4) can be sealably mounted to either side of the circumferential support ring 102. Pressure taps 108 and 110 extend through the circumferential support ring 102 and into the flow of process fluid. Tap 108 can be positioned on a downstream side of the orifice plate 104 and tap 110 can be positioned on an upstream side of plate 104.

Pressure taps 108 and 110 can be radially offset to reduce the thickness of the circumferential support ring 102. Taps 108, 110 couple to bore holes 109, 111 which extend to opposed sides of the flow plate 104. In one specific configuration, taps 108 and 110 are arranged at 90° relative to one another. A corner tap or flange tap configuration can be used. Conduits (shown in FIG. 4) are coupled to pressure taps 108 and 110 and are used to fluidically couple a pressure transmitter (not shown) to the upstream and downstream pressures. This allows the pressure transmitter to measure a differential pressure which is related to the flow of process fluid.

Figure 4:
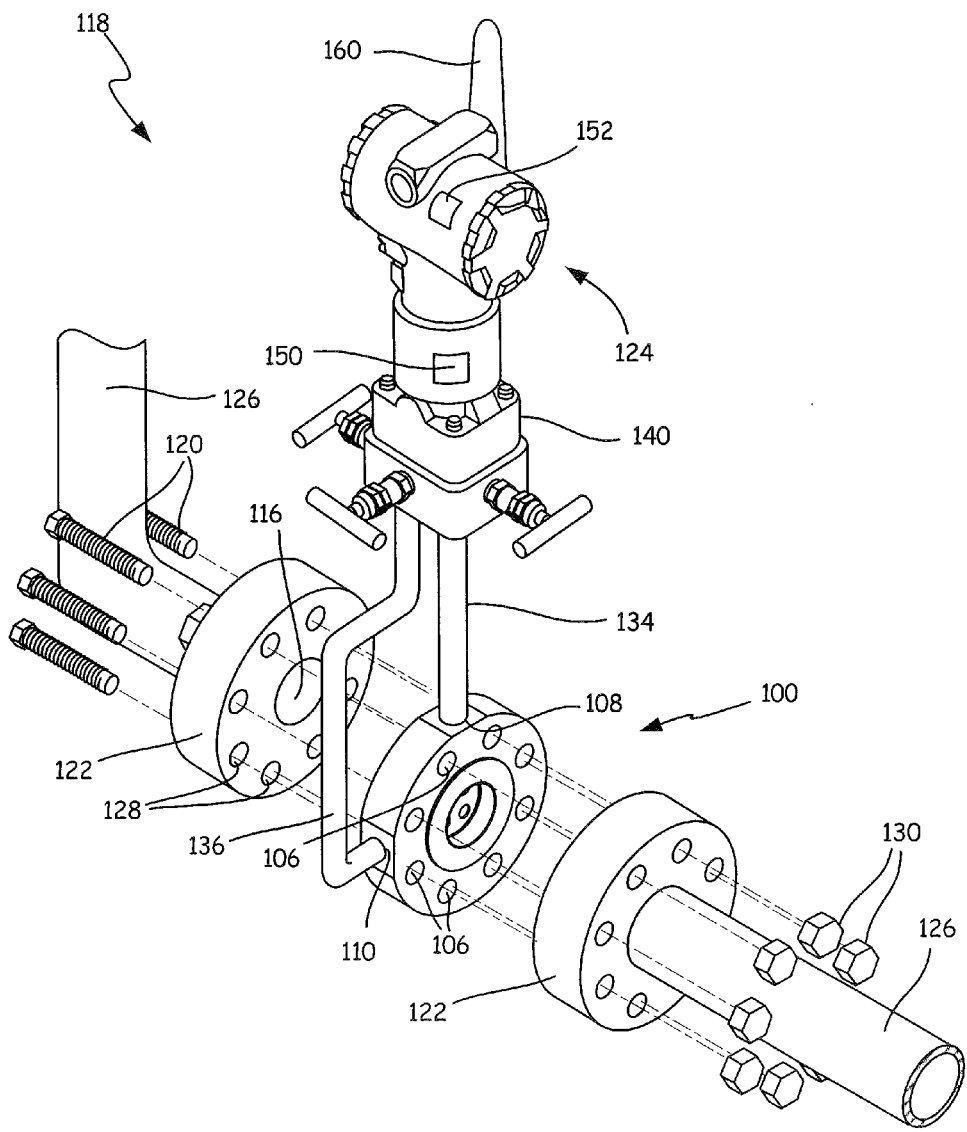
FIG. 4 is an exploded view of a pressure transmitter coupled to the orifice plate assembly illustrated in FIGS. 1-3.

FIG. 4 is an exploded perspective view of a flow measuring system 118 according to one embodiment including a pressure transmitter 124. Orifice plate assembly 100 is mounted between flanges 122 of process piping 126. The flanges 122 include bolt holes 128 which align with holes 106 of orifice plate assembly 100 and are configured to receive bolts 120 therethrough. Bolts 120 are secured with nuts 130.

As illustrated in FIG. 4, impulse piping 134 and 136 are received in taps 108 and 110, respectively. These connections can use, for example, threading or other attachment techniques such as welds. Impulse piping 134 and 136 couple to a manifold 140. Manifold 140 is illustrated as including a number of valves and is used to fluidically couple a differential pressure from taps 108, 110 to pressure inputs (not shown) of pressure transmitter 124. A differential pressure sensor 150 is carried within the pressure transmitter 124 and is responsive to the applied differential pressure. The differential pressure sensor 150 may be an individual differential pressure sensor or may be configured as two separate static pressure transmitters designed to sense the upstream and downstream pressures on either side of the orifice plate assembly 100. Transmitter circuitry 152 of transmitter 124 is electrically connected to the pressure sensor 150 and is configured to provide an output related to the differential pressure. This differential pressure is indicative of the flow of process fluid through the orifice plate assembly 100.

As illustrated in FIG. 4, orifice plate 104 is generally aligned with the openings 116 of process piping 126. The opposed sides of the circumferential support ring 102 seal against faces of flanges 122 through a force applied by bolts 120. In this configuration, the flow of process fluid from the process piping 126 is forced through the openings 104A of orifice plate 104. The transmitter circuitry can provide an output on a two-wire process control loop such as is known in the art. For example, a two-wire process control loop can be used to carry information as well as provide power to the device. The communication can be in an analog format, such as a 4-20 mA current level, or may alternatively or additionally include a digital signal. Wireless communication techniques may also be employed for example, in accordance with the WirelessHART® communication protocol in accordance with IEC 62591 or using other techniques. Transmitter 124 is illustrated as including an optional antenna 160 for such wireless communication.

The configuration discussed herein provides a single piece design which is well suited for application in severe environments such as those that experience vibration, high temperature and/or high pressure. One specific application is for nuclear safety related implementations. The single piece design mitigates expansion and contraction issues which may be problematic in high temperature applications. Different size integral orifice plates can be provided for use with differing line sizes. Although a conditioning orifice plate including four openings is illustrated, any orifice plate configuration may be implemented. The orifice plate assembly may be fabricated using molding techniques or machined from a single piece of material such as metal or plastic. One example material is stainless steel. In another configuration, the orifice plate assembly is fabricated using an additive technique such as, for example, using 3D printing techniques.

Although the present invention has been described with reference to preferred embodiments, workers skilled in the art will recognize that changes may be made in form and detail without departing from the spirit and scope of the invention. The single piece of orifice plate assembly can be fabricated of any appropriate material including plastics or metals. One typical metal which may be used is stainless steel. The pressure taps can be in accordance with standardized connections such as NPT (National Pipe Thread) connections. The diameter of the circumferential support ring can be selected to match the diameter of the pipe flanges to allow easy alignment of the flow plate region with the orifices of the pipes. The arrangement facilitates remote mounting of the pressure transmitter with respect to the orifice plate assembly and connected to the pressure taps using impulse piping. Although only two pressure taps are illustrated, any number of pressure taps may be employed. The thickness of the orifice plate region may be the same as, thicker than, or thinner than, the thickness of the circumferential support ring. The orifice plate region is illustrated as a flat plate, however, other configurations may also be used. As used herein, the terms integrated and single piece refer to a configuration in which the orifice plate is formed from a single piece of material rather than by attaching individual piece together.

What is claimed is:

1. An orifice plate assembly for use with a process variable transmitter for measuring flow of a process fluid, the orifice plate comprising:
    a single piece body including a circumferential support ring having a first face configured to be sealingly coupled to a first flange of a first process pipe and a second face configured to be sealingly coupled to a second flange of a second process pipe;
    a flow plate region positioned between the first and second pipes having first and second sides and concentric with the circumferential support ring;
    at least one flow orifice in the flow plate region configured to provide a restricted fluid path between the first and second process pipes;
    a first pressure tap configured to fluidically couple the process variable transmitter to the process fluid proximate the first side of the flow plate region; and
    a second pressure tap configured to fluidically couple the process variable transmitter to the process fluid proximate the second side of the flow plate region.

2. The orifice plate assembly of claim 1 including first and second impulse piping coupled to respective first and second pressure taps.

3. The orifice plate assembly of claim 2 wherein the first and second impulse piping couple to inlets of the process variable transmitter.

4. The orifice plate assembly of claim 3 including a manifold to couple the impulse piping to the process variable transmitter.

5. The orifice plate assembly of claim 1 wherein the first and second pressure taps are radially offset from one another.

6. The orifice plate assembly of claim 5 wherein the radial offset of the first and second pressure taps comprises 90°.

7. The orifice plate assembly of claim 1 wherein the orifice plate comprises a conditioning orifice plate.

8. The orifice plate assembly of claim 7 wherein the conditioning orifice plate comprises a flat circular section having a plurality of openings formed therethrough.

9. The orifice plate assembly of claim 1 wherein the circumferential support ring includes a plurality of mounting holes configured to receive bolts therethrough to secure the circumferential support ring to the first and second flanges of the respective first and second process pipes.

10. The orifice plate assembly of claim 1 including a pressure transmitter fluidically coupled to the first and second pressure taps and configured to measure a differential pressure therebetween.

11. The orifice plate assembly of claim 1 wherein the circumferential support ring and the flow plate region are machined as a single piece.

12. The orifice plate assembly of claim 1 wherein the circumferential support ring and the flow plate region are fabricated using 3D printing techniques.

13. The orifice plate assembly of claim 1 wherein at least one of the first and second flanges comprise a weld neck.

14. The orifice plate assembly of claim 1 wherein the circumferential support ring and integral orifice plate are formed of a metal.

15. The orifice plate assembly of claim 1 wherein the circumferential support ring and integral orifice plate are formed of a plastic.

16. The orifice plate assembly of claim 1 wherein the orifice plate region includes four flow orifices.

17. The orifice plate assembly of claim 1 wherein the orifice plate region has a thickness which is less than a thickness of the circumferential support ring.

18. The orifice plate assembly of claim 1 wherein the orifice plate region has a thickness which is the same as a thickness of the circumferential support ring.

* * * * *